(12) United States Patent
Tabata (10) Patent No.: US 7,368,140 B2
(45) Date of Patent: May 6, 2008

(54) NUT FRAGMENTS AND METHODS OF FORMING NUT FRAGMENTS

(75) Inventor: Yutaka Tabata, Minato-ku (JP)

(73) Assignee: Tabata Inc., Tokyo (JP)

( * ) Notice: Subject to any disclaimer, the term of this patent is extended or adjusted under 35 U.S.C. 154(b) by 477 days.

(21) Appl. No.: 10/802,650

(22) Filed: Mar. 16, 2004

(65) Prior Publication Data

US 2005/0142264 A1    Jun. 30, 2005

(51) Int. Cl.
*A23P 1/00*    (2006.01)
(52) U.S. Cl. ............ 426/482; 426/518; 426/481; 426/44; 426/478; 426/632
(58) Field of Classification Search ............. 426/518, 426/481, 482, 444, 478, 632
See application file for complete search history.

(56) References Cited

U.S. PATENT DOCUMENTS 6,224,932 B1    5/2001    Stahmann et al.

FOREIGN PATENT DOCUMENTS

| EP | 1 145 653 |   | 10/2001 |
|----|-----------|---|---------|
| FR | 2450067   | * | 9/1980  |
| JP | 57-102166 | * | 6/1982  |
| JP | 57-102166 A |   | 6/1982  |
| JP | 57-177683 | * | 11/1982 |

* cited by examiner

*Primary Examiner*—Anthony Weier
(74) *Attorney, Agent, or Firm*—Morrison & Foerster LLP (57) ABSTRACT

Raw material nuts may be quenched using an extremely low temperature liquefied gas to produce cracks in the raw material nuts. The cracked raw material nuts may then be crumbled along the cracks to separate the nuts into small nut fragments. After returning the temperature of the nuts to the ambient temperature, additional cracks can be further produced in the nut fragments by quenching the nut fragments. Smaller nut fragments can then be obtained by crumbling along the cracks. Small nut fragments in desired sizes may be obtained by repeating the process of cracking and crumbling as many times as desired. The astringent skin of the nuts may also be peeled off while the small nut fragments are produced.

12 Claims, 6 Drawing Sheets

NUT FRAGMENTS AND METHODS OF FORMING NUT FRAGMENTS

FIELD OF THE INVENTION

This invention relates to nut products and methods of forming nut products.

BACKGROUND

A variety of nuts, including shelled fruits and seeds, have been widely used as edible ingredients of sweets and foods. After extracting the edible portions from the harvested nuts (portions after being removed from the shells), raw material nuts or processed nuts after being roasted are used for a variety of purposes. The nuts available include those which maintain their shape after they are taken out of the shells (whole nuts), those in a paste form, or those in a powder form. In other cases, they are often processed in a variety of sizes such as grains or small fragments which are suitable for their respective purposes. When nuts are used as secondary ingredients in food manufacturing as in the manufacturing of sweets or breads, they are generally provided in very small fragments (grains). To prepare small nut fragments, mechanical force is typically applied using a variety of types of grinders or cutters. If the raw materials contain large amounts of oily components, such as in pecans, macadamia nuts, peanuts, hazelnuts, etc., the conventional method of producing ground products in desirable sizes is by selecting either a forced grinding method using metallic rollers, or a chopping method using an appliance having a sharp cutter. The grinding can be performed by passing the nuts between two toothed rollers or between a roller and a toothed plate, and the cutting can be performed by using a sharp, thick blade to cut off pieces of hard textured nuts.

In the conventional mechanical separation using a grinder or a cutter, the production of undesirable powder or small particles generally cannot be avoided during the grinding process. In addition, it has been difficult to efficiently process the nut fragments into desired sizes. In addition, when the nuts have a high oil content, the ratio of powder or unusable scrap particles to the desired nut fragments produced during grinding increases. As the cost of the raw materials (nuts) increases, the value lost through the production of unusable scraps increases. Therefore, a major subject of concern is that the prices of the chopped nut fragments greatly depend upon whether these byproducts, for example, the secondary products prepared by crushing into a paste form, can be expected to have high demand.

Another result of conventional mechanical grinding techniques is that the compression of the raw material nuts when grinding the nuts causes the oil contents in the raw material nuts to leach out. As a result, the small nut fragments present an oily finish. This can cause premature deterioration in the quality of the nut fragments.

BRIEF SUMMARY OF THE INVENTION

In accordance with embodiments of the present invention, a method of processing a nut is provided. The method comprises forming cracks in the nut by exposing the nut to a low temperature; and separating the nut into a plurality of nut fragments.

In accordance with other embodiments of the present invention, nut fragments are provided. These nut fragments are characterized in that raw material nuts are quenched to form cracks in the raw material nuts and the cracked raw material nuts are separated along the cracks to form nut fragments.

In accordance with other embodiments of the present invention, nut fragments are provided. These nut fragments are characterized in that raw material nuts are quenched using an extremely low temperature liquefied gas to form cracks in the raw material nuts and the cracked raw material nuts are crumbled along the cracks to form small fragments.

In accordance with other embodiments of the present invention, nut fragments are provided. These nut fragments are characterized in that raw material nuts are quenched using liquid nitrogen to form cracks in the raw material nuts and the cracked raw material nuts are crumbled along the cracks to form small fragments.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Forced mechanical grinding is limited in its ability to efficiently form small nut fragments in desired sizes. The ratio of production of powdery substance and scraps is high, which reduces product yield and increases cost of production. The oily components in the raw material nuts leach out to present stickiness in the small nut fragments and it is difficult to peel off the thin skin on the surface (astringent skin), which easily causes deterioration of product quality of the small nut fragments due to oxidation of the oily components.

In accordance with embodiments of the present invention, a method of manufacturing nut fragments is provided. The subjects of concern in the forced mechanical grinding method are overcome by forming small fragments without applying forced mechanical grinding and as a result, small nut fragments can be obtained with improved quality compared to the conventional small nut fragments which are produced by forced mechanical grinding.

As shown in the examples of nut fragments described herein, a variety of kinds of nuts including, for example, walnuts, pecans, peanuts, cashew nuts, macadamia nuts, hazelnuts, almonds, pistachio nuts, Brazil nuts, etc., seeds, drupes (all of which are referred to herein as "nuts") may be used as raw material nuts to be formed into small fragments. As used herein, the term "nut fragments" refers to portions of a nut. Where the nut is of a type that includes an outer shell containing a seed, the nut fragment is a fragment or portion of the seed contained within the shell, and does not refer to a fragment or portion of the outer shell.

The small fragments of nuts may be formed by first quenching raw material nuts to form cracks in the raw material nuts and then crumbling the cracked raw material nuts along the cracks. Quenching can be performed using an extremely low temperature liquefied gas. Liquid nitrogen, for example, can be used as an extremely low temperature liquefied gas. The nut fragments can be further processed by repeating cracking by quenching and crumbling along the cracks as many times as desired. The astringent skin of nuts can be peeled off when small fragments are crumbled along the cracks.

In accordance with embodiments of the present invention, the raw material nuts and/or the nut fragments may be quenched by exposing them to extremely low temperatures. This quenching causes cracks to form in the nut, which then facilitates easy separation of the nut into smaller nut fragments without the need to apply a high level of pressure onto the nut. In some embodiments, the nuts may be quenched by exposure to temperatures of less than approximately $-40°$ C., or less than approximately $-100°$ C., less than approximately $-150°$ C., less than approximately $-200°$ C., or less than approximately $-250°$ C. This quenching may be achieved by exposing the nuts to an extremely low temperature liquid, such as a cryogen, which is a liquid that boils at a temperature below about 110 K ($-160°$ C.) at atmospheric pressure. Examples of suitable low temperature liquids include, for example: liquid nitrogen (which has a boiling point of approximately $-196°$ C.), liquid oxygen, liquefied chlorofluorocarbons (i.e., Freon), liquefied gas (LPG), and others.

As shown in various methods for forming small nut fragments, in accordance with embodiments of this invention, the raw material nuts may be quenched to form cracks in the raw material nuts and followed by crumbling the raw materials nuts along the cracks to separate them into small fragments instead of by forced mechanical grinding of the raw material nuts. An extremely low temperature liquefied gas, such as liquid nitrogen, can be used for quenching. Among the nut fragments, those with larger grain sizes can be further treated by the aforementioned quenching process to form cracks and by crumbling along the cracks to be separated into smaller fragments. The separation by cracking followed by crumbling can be repeated as many times as desired to obtain desirable sizes. When separated by crumbling along the cracks, the thin, astringent skin of the nuts may be peeled off. The cracked raw material nuts can be easily crumbled by shaking, agitating, rubbing, kneading, or loosening by hand or using an equivalent tool. In this case, two or more crumbling methods, such as shaking, blowing compressed air, or agitating by hand or using an equivalent tool can be combined.

The nut fragments in accordance with embodiments of this invention may be produced by quenching the raw material nuts to be cracked and by crumbling along the cracks in the raw material nuts to separate the raw material nuts into small fragments. These embodiments may achieve one or more of the following effects.

First, because small fragments can be formed without being mechanically crushed, the shapes and sizes of the nut fragments produced may be more uniform and each shape or each size can be used separately for appropriate uses.

Second, in the case when quenching the raw material nuts using an extremely low temperature liquefied gas, such as, e.g., liquid nitrogen, the same effects as those mentioned above can be achieved.

Third, because small fragments may be formed by separating the raw material nuts along the cracks by shaking the cracked raw material nuts, or by blowing compressed air or by agitating, rubbing, kneading or loosening by hand or using an equivalent tool, oily components of the raw material nuts do not leach out onto the surface of the small nut fragments, forming a non-sticky surface on the small fragments. The non-oily nut fragments can be handled more easily as compared to the small nut fragments which are produced by forcefully grinding raw material nuts using mechanical grinding. In addition, because oily components do not leach out onto the surface of the small nut fragments, the nut fragments are not oxidized due to the presence of oily contents. Thus, the product quality is not deteriorated, making long-term storage possible. Moreover, because a powder is not generated, the small nut fragments are hardly contaminated, resulting in improved quality of the small nut fragments.

Fourth, the nut fragments which are obtained can be further processed to form smaller fragments by repeating cracking by quenching and crumbling along the cracks as many times as desired so that small nut fragments are obtained in a desired size.

Fifth, because the astringent skin may be removed from the nuts as part of the cracking and separating process, astringency which is specific to the astringent skin is absent and the astringent skin does not become an obstacle when eaten, presenting a smooth taste. Therefore, the problems with the presence of the astringent skin can be solved.

According to methods of forming nut fragments in accordance with embodiments of the present invention, the nut fragments may be produced by quenching the raw material nuts to form cracks in the nuts, and then by crumbling along the cracks in the raw material nuts to separate the nuts into small fragments. One or more of the following effects described below may be achieved.

First, the small nut fragments obtained may be uniform in terms of shapes and sizes so that these small nut fragments can be more easily directed to specific uses.

Second, if the nut fragment products are selected by size using, for example, a sieve, small nut fragments in a desired size can be selected from the uniform nut fragments.

Third, because small nut fragments may be formed by initially cracking by quenching followed by crumbling and separating along the cracked portions instead of mechanically forced grinding, the raw material nuts are not compressed when forming the small nut fragments. As a result, oily components do not leach out from the raw material nuts so that the surface of the small nut fragments does not become sticky and the small nut fragments can be easily handled.

Fourth, because oily components do not leach out from the raw material nuts, the small nut fragments are not oxidized due to the presence of oily contents and the product quality does not deteriorate so that long-term storage becomes possible.

Fifth, because the raw material nuts are not mechanically compressed, a powder is not generated, resulting in a high product yield. Due to the absence of a powdery product, the small nut fragments are hardly contaminated, resulting in improved quality of the small nut fragments.

Sixth, because there is no need for mechanical grinding, there is a decreased chance of contamination by foreign substances, making the products safer for eating.

When raw material nuts are quenched using an extremely low temperature liquefied gas, there is no need for machines or devices for grinding. Thus, small nut fragments can be formed using a simple system. If liquid nitrogen is used as the extremely low temperature liquefied gas, the same effects can be achieved. If raw material nuts are brought into contact with or dipped in an extremely low temperature liquefied gas for quenching, the same effects can be achieved.

If the nut fragments are further treated by repeating cracking by quenching and crumbling along the cracks as many times as desired to form further smaller fragments, nut fragments in a desired size can be obtained.

Raw material nuts may not naturally crumble into smaller nut fragments very easily. Because small fragments may be formed by shaking the cracked raw material nuts, separation of the nuts into nut fragments becomes easy. In some embodiments, compressed air may be blown onto the cracked raw material nuts to cause the raw material nuts to separate along the cracks formed during quenching. In other embodiments, the cracked raw material nuts are crumbled and separated by agitating, rubbing, kneading, or loosening by hand or using an equivalent tool. This agitating may be performed using less force than is used in conventional nut grinding methods.

According to conventional methods of forming small fragments by mechanical grinding the nuts, the oily components in the raw material nuts may leach out onto the surface of the ground nut fragments, making it difficult to peel off the astringent skin. In contrast, according to embodiments of this invention, nut fragments may be formed by crumbling the cracked raw materials nuts along the cracks and the astringent skin can be peeled off from the nuts. The astringent skin can be removed easily and thoroughly while being crumbled. This may be particularly useful when processing walnuts, which have an astringent skin that is difficult to remove. When walnuts are processed using the methods describe herein, the astringent skin may be easily removed, obviating the need for performing additional astringent skin removal work.

Various nut fragments formed in accordance with embodiments of this invention and methods of forming nut fragments will be explained below. The described embodiments are only examples of this invention and this invention should not be limited by the examples.

Figure 1A:
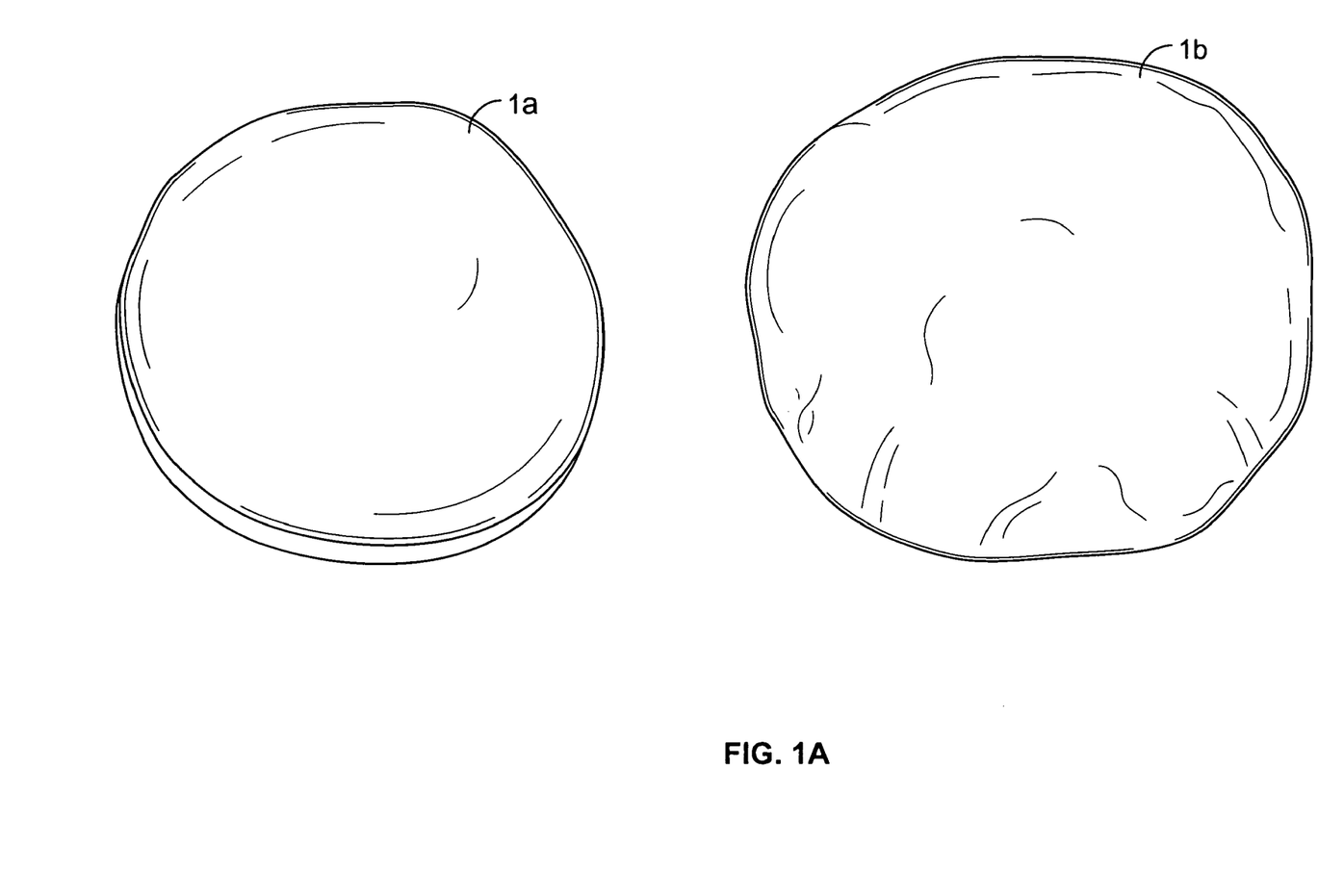
FIG. 1A is an explanatory view showing an example of the raw material nuts.
Figure 1B:
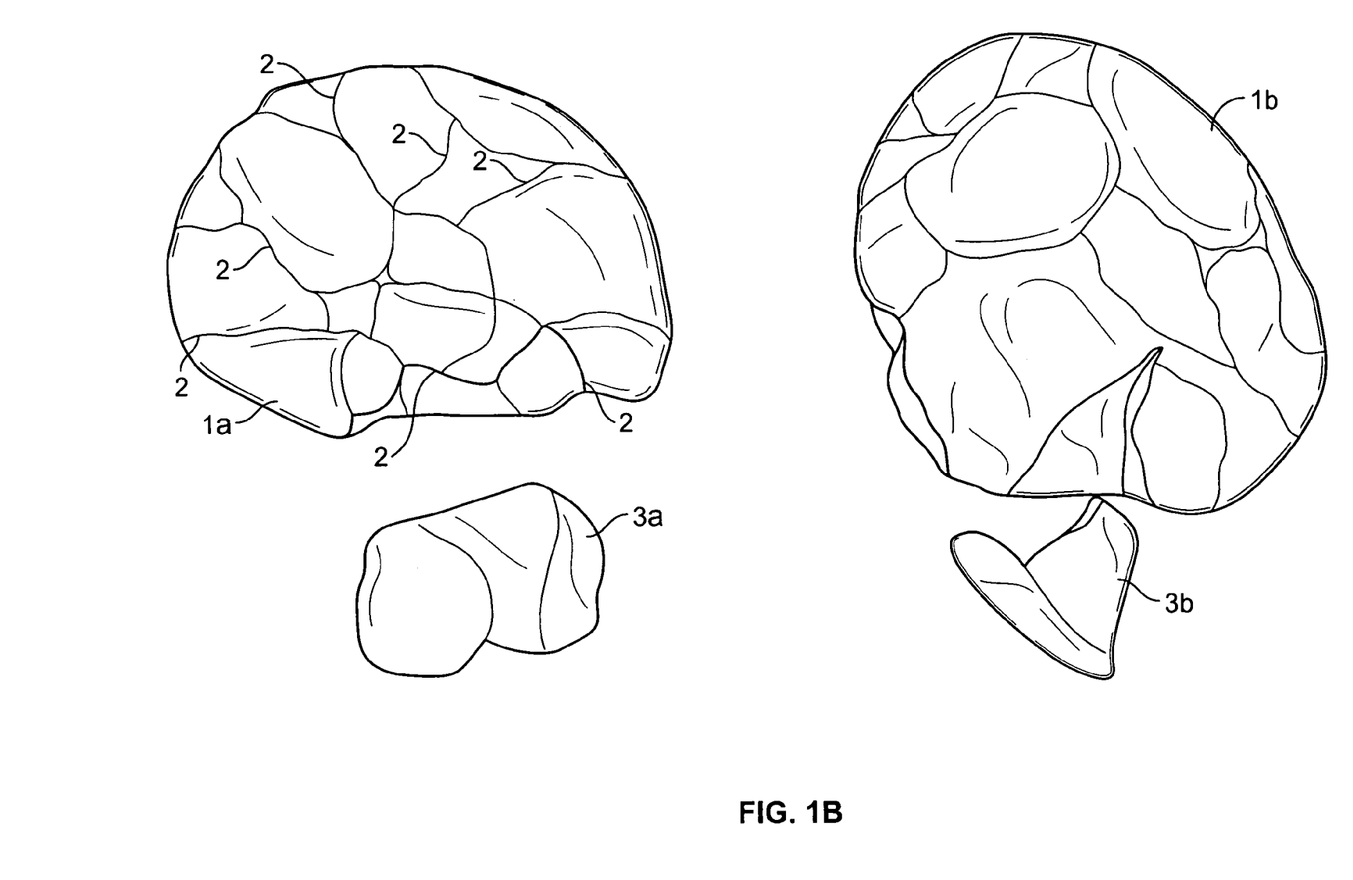
FIG. 1B is an explanatory view showing an example of the state where cracks are formed in the raw material nuts.

In accordance with embodiments of the present invention, nut fragments may be produced as follows. FIG. 1A shows a pair of raw material nuts 1a-1b. These raw material nuts 1a-1b may be quenched using an extremely low temperature liquefied gas to produce cracks in the raw material nuts. FIG. 1B shows cross sections of nuts 1a-1b, which are stained so that the cracks 2 are made more clearly visible. It can be seen here that nut fragments 3a, 3b have already separated from the raw material nuts 1a, 1b.

Figure 1C:
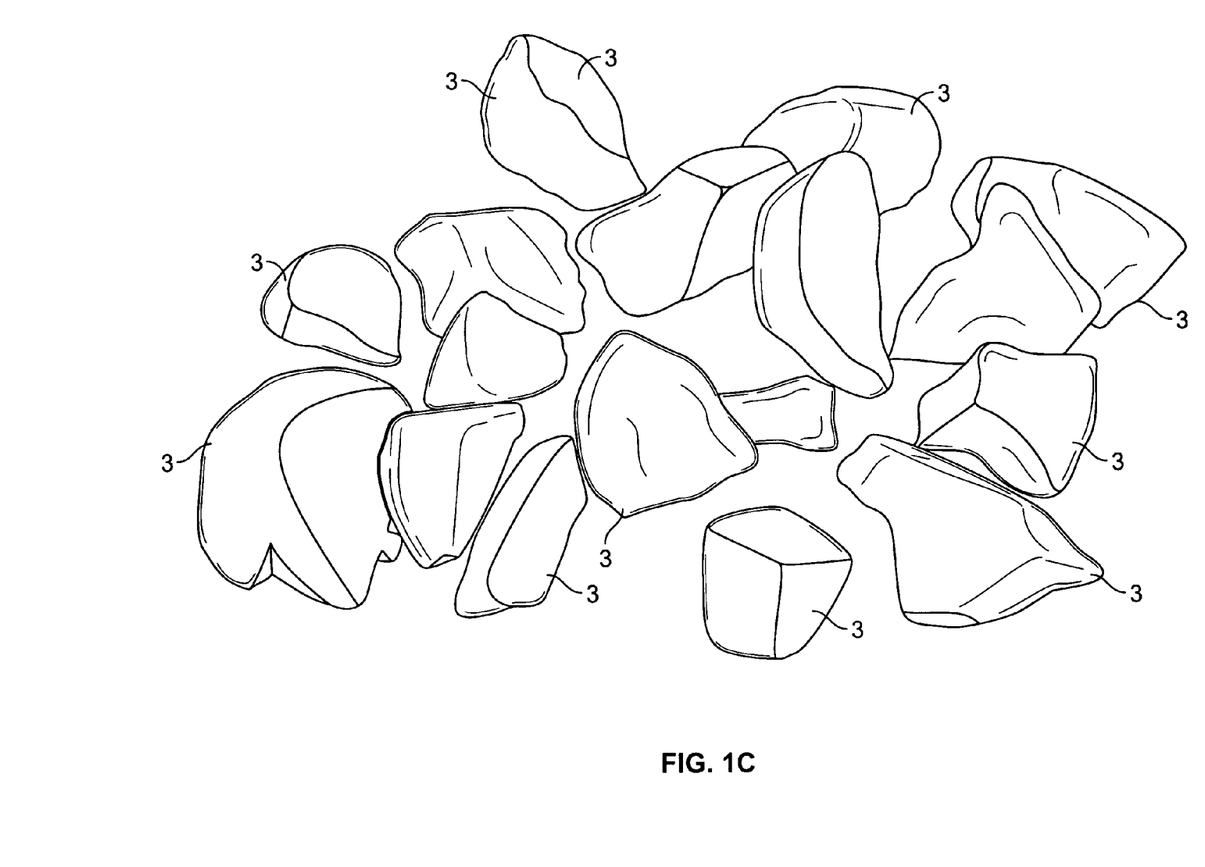
FIG. 1C is an explanatory view showing an example of nuts crumbled along cracks.

Next, the cracked raw material nut is crumbled along the cracks 2 to obtain small fragments 3 of nuts, shown in FIG. 1C. For the nut fragments with larger grain sizes among the small nut fragments 3 shown in FIG. 1C, quenching using an extremely low temperature liquefied gas to produce cracks in the nut fragments obtained after initial quenching and separation by crumbling along the cracked portions of the nut fragments can be repeated as many times as needed to obtain small nut fragments in the desired sizes. The astringent skin on the nut surface may flake off automatically by the formation of cracks and subsequent crumbling and separation.

The raw material nuts can include raw nuts or cooked nuts, such as roasted, boiled, or steamed nuts. In some embodiments directed to the cracking of boiled or steamed nuts, quenching can be carried out after the nuts are forcefully dried such that the water contents reach a few percent. The nuts may be boiled or steamed as part of a nut blanching process. In other embodiments, no drying step is used.

Extremely low temperature liquefied gases which can be used in accordance with embodiments of the present invention include extremely low temperature liquefied gases that can quench raw material nuts and can quench raw material nuts in a short time (a few seconds to a few minutes) to form cracks. It may be preferable to use extremely low temperature liquefied gases of $-40°$ C., or lower. Examples include: liquid nitrogen, liquid oxygen, liquefied gas (LPG), flon gas (CFC: chlorofluorocarbon), etc. In particular, it may be desirable to select a gas which is inexpensive, highly safe, and suitably sanitary for use with food products. From this respect, liquid nitrogen (having a boiling point of $-196°$ C.) may be used. These extremely low temperature liquefied gases can be used under elevated pressure.

In order to quench the raw material nuts, the raw material nuts may be exposed to extremely low temperatures. This can be accomplished by bringing an extremely low temperature liquefied gas in contact with the external surface of the raw material nuts or penetrated into the core of the nuts. The nuts can be exposed to the extremely low temperature liquefied gas by blowing or spraying the liquefied gas onto the raw material nuts, or by dipping the raw material nuts into a vessel containing the extremely low temperature liquefied gas. The quenching time to form cracks in the raw material nuts by spraying or by dipping may range, for example, from a few seconds to a few minutes depending upon the type of raw material nut and the freezing process.

In various embodiments, the raw material nuts may be placed in contact with an extremely low temperature liquefied gas either continuously or intermittently by spraying an extremely low temperature liquefied gas over the raw material nuts or by dipping the raw material nuts into an extremely low temperature liquefied gas.

Figure 2:
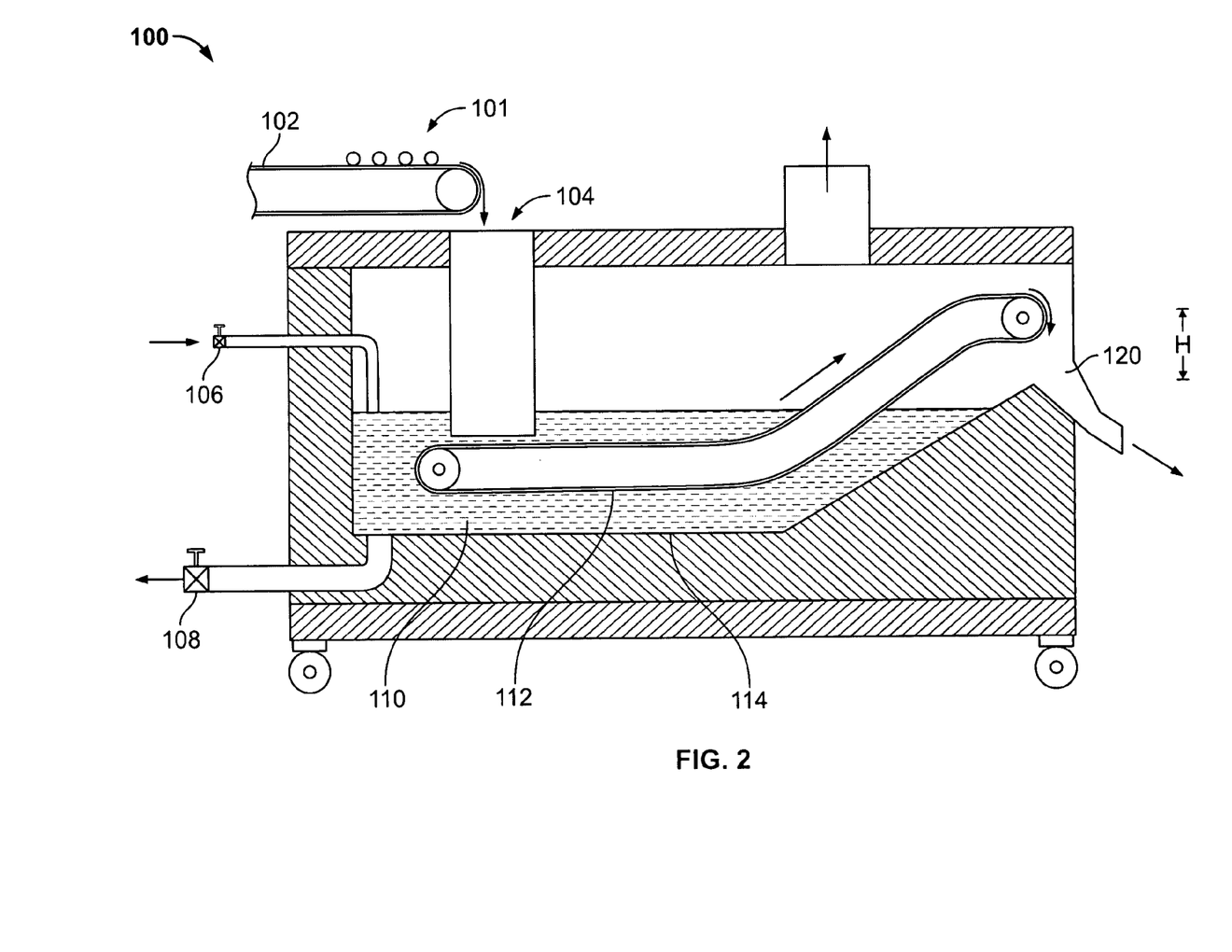
FIG. 2 is an explanatory view showing an example of this invention's method for forming small nut fragments.

FIG. 2 shows a system 100 which can place the raw material nuts into continuous contact with a pool of extremely low temperature liquefied gas 110, such as liquid nitrogen. An inlet valve 106 and an outlet valve 108 can be used to supply liquid nitrogen into a tank 114. A conveyor 112, such as an endless bucket conveyor or mesh conveyor, is run through the extremely low temperature liquefied gas 110 in the tank 114. Raw material nuts 101 are placed on a loading conveyor 102, which loads the nuts 101 through opening 104 onto the conveyor 112 in the tank 114. An exhaust port 122 is provided to allow gaseous nitrogen to flow out of the tank 114.

In order to provide intermittent contact between the nuts and the low temperature liquefied gas, the raw material nuts can be dipped, for example, into an extremely low temperature liquefied gas by initially placing the raw material nuts in a container such as a net, basket, or bag, then by dipping the whole container into a tank which is filled with the extremely low temperature liquefied gas. The container can be repeatedly immersed and removed from the liquefied gas.

It may be desirable that the endless conveyor 112, net, basket, bag, or other container for carrying the nuts is made of materials which are not easily corroded or damaged by an extremely low temperature liquefied gas. A desirable material which can be used includes, for example, a metal such as stainless steel.

Cracks can be formed automatically in the raw material nuts by said quenching (as seen in FIG. 1B). If the raw material nuts in which cracks are formed are dropped from the endless conveyor 112 onto an output port platform 120, the cracked nuts may automatically separate along the cracks to form multiple nut fragments. In some embodiments, the nuts may be dropped, for example, from a height of several tens of centimeters. In the illustrated embodiment, the nuts may be dropped from a height of approximately 30 to 40 cm onto the output port platform 120, causing more than one half of the cracked raw material nuts to separate to form small nut fragments.

In some embodiments, the cracked raw material nuts may be left under moisture-proof conditions or, if desired, are heated to the ambient temperature, causing the cracked nuts to automatically separate to form smaller-sized nut fragments, as shown in FIG. 1C. In the case when crumbling does not occur easily or when the amount of fragmentation is not sufficient, crumbling and separation can be assisted by shaking the cracked raw material nuts or by blowing compressed air onto the cracked raw material nuts, or by lightly kneading, agitating or loosening the raw material nuts by hand. An instrument instead of the hand can be used. In case of shaking, the raw material nuts may be shaken by placing the cracked nuts on a vibrating conveyor or platform.

An extremely low temperature liquefied gas can be brought into contact with the raw material nuts by dipping or by spraying directly or indirectly. The direct contact method may, in some cases, form cracks more effectively. In the indirect contact of an extremely low temperature liquefied gas with the raw material nuts, an extremely low temperature liquefied gas is brought into contact with raw material nuts via a container made of a material which is non-permeable to the extremely low temperature liquefied gas. In the direct contact, an extremely low temperature liquefied gas is brought into direct contact with raw material nuts.

One example of a direct contact treatment is shown in FIG. 2, in which an endless conveyor 112 such as a bucket conveyor or a mesh conveyor is installed in such a way that it runs through the extremely low temperature liquefied gas 110 in the tank 114 such that raw material nuts 101 carried on the endless conveyor 112 are dipped in the extremely low temperature liquefied gas 110. If the raw material nuts are placed in a non-permeable container and then the container is dipped in the extremely low temperature liquefied gas, or if an extremely low temperature liquefied gas is blown onto the non-permeable container, this would result in an indirect contact treatment. The low temperature liquefied gas would not contact nuts directly, but could lower the temperature of the nuts to a level sufficient to create cracks in the nuts. If the container is permeable, the extremely low temperature liquefied gas can be directly brought into contact with the raw material nuts in the container, resulting in a direct contact treatment. According to any of these methods, the raw material nuts are quenched to form cracks 2 and are crumbled along the cracked regions to form small nut fragments 3.

In some embodiments, the nuts are exposed to ambient temperature, which constitutes a temperature without condensation (i.e., a temperature higher than the dew point). In the case of natural warming, the container is left standing overnight. In the case of forced warming using, for example, warm air at 60° C. to 70° C., the ambient temperature may be resumed, for example, within a few minutes to a few tens of minutes. In the case of using warm air, the cracked raw material nuts can be passed through a warm air passage. This process can help prevent the nuts from becoming undesirably soggy or saturated with condensation.

The raw material nuts 101 are quenched to form cracks 2 and are crumbled from the cracked portions to form small nut fragments 3. The number and size of the small nut fragments 3 obtained from the raw material nuts may vary with the size and type of the raw material nuts. For example, when raw macadamia nuts with a diameter of 15 mm (as shown in FIG. 1A) were used as raw material nuts 101 and quenched as described above, cracks 2 were formed as shown in FIG. 1B and the nuts were crumbled along the cracks 2 to produce small nut fragments 3, as shown in FIG. 1C. As shown in FIG. 1C, approximately eighteen nut fragments 3 were formed, with the larger nut fragments ranging from 5 mm to 8 mm in diameter and the smaller nut fragments ranging from 2 to 3 mm in diameter. In this case, barely any nut powder was formed.

If small nut fragments smaller than the ground products in FIG. 1C are needed, the nut fragments shown in FIG. 1C may be initially returned to the ambient temperature, subsequently quenched again using an extremely low temperature liquefied gas to form cracks to be crumbled along the cracks. Small nut fragments in a desired size can be obtained by repeating the quenching and crumbling as many times as desired. In this case, the cooling conditions when the process is repeated can be identical or different.

The small nut fragments in a desired size can be directly packaged. A sieve can be used to select nut fragments of a particular size, and those fragments can be packaged in desired portions.

EXAMPLE 1

Walnut Fragments

Figure 3:
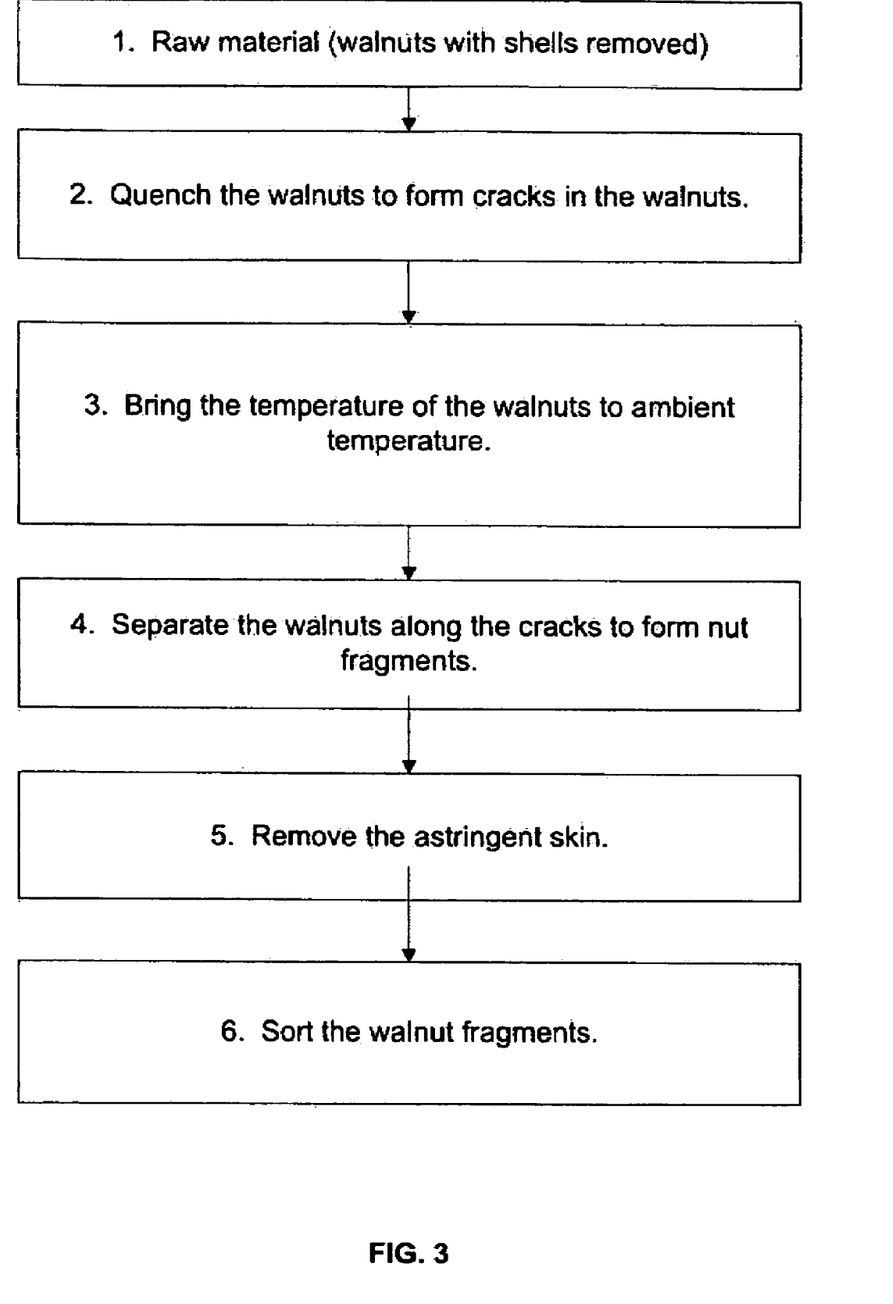
FIG. 3 is a flowchart in the case of forming walnut small nut fragments.

A method of forming walnut fragments in accordance with embodiments of the present invention will be described below with reference to FIG. 3. In step 1, walnuts having their shells removed are provided as raw material nuts. In step 2, the walnuts are quenched to form cracks in the walnuts. This can be performed by dipping the walnuts in liquid nitrogen in an adiabatic container for 20 seconds. In step 3, the walnuts are removed from the liquid nitrogen and brought to ambient temperature. This can be performed by placing the walnuts in a moisture-proof container, such as a sealed bag or can, while the walnuts are brought to ambient temperature. Additional heating may be used, if desired.

In step 4, the cracked walnuts are separated along the cracks to form nut fragments. This can performed by gently stirring and blending the cracked walnuts, such that the walnuts are crumbled and separated along the cracks to form small nut fragments. Because mechanical grinding or other large forces are not applied to the walnuts during this fragmentation process, oily components are not released from the walnuts. In step 5, the astringent skin is removed from the nut fragments by, for example, using forced air to blow the skin off of the nut fragments.

In step 6, the small walnut fragments may be sorted according to size. This can be performed using a sieve or other sorting device. A mesh size of the sorting device can be selected to separate the desired size fragments from the other sizes. As an example, a mesh size of 3 to 10 mesh may be used.

In various embodiments, the order of the steps may be changed. In particular, in some embodiments, steps 3 and 4 may be reversed.

EXAMPLE 2

Macadamia Nut Fragments

Figure 4:
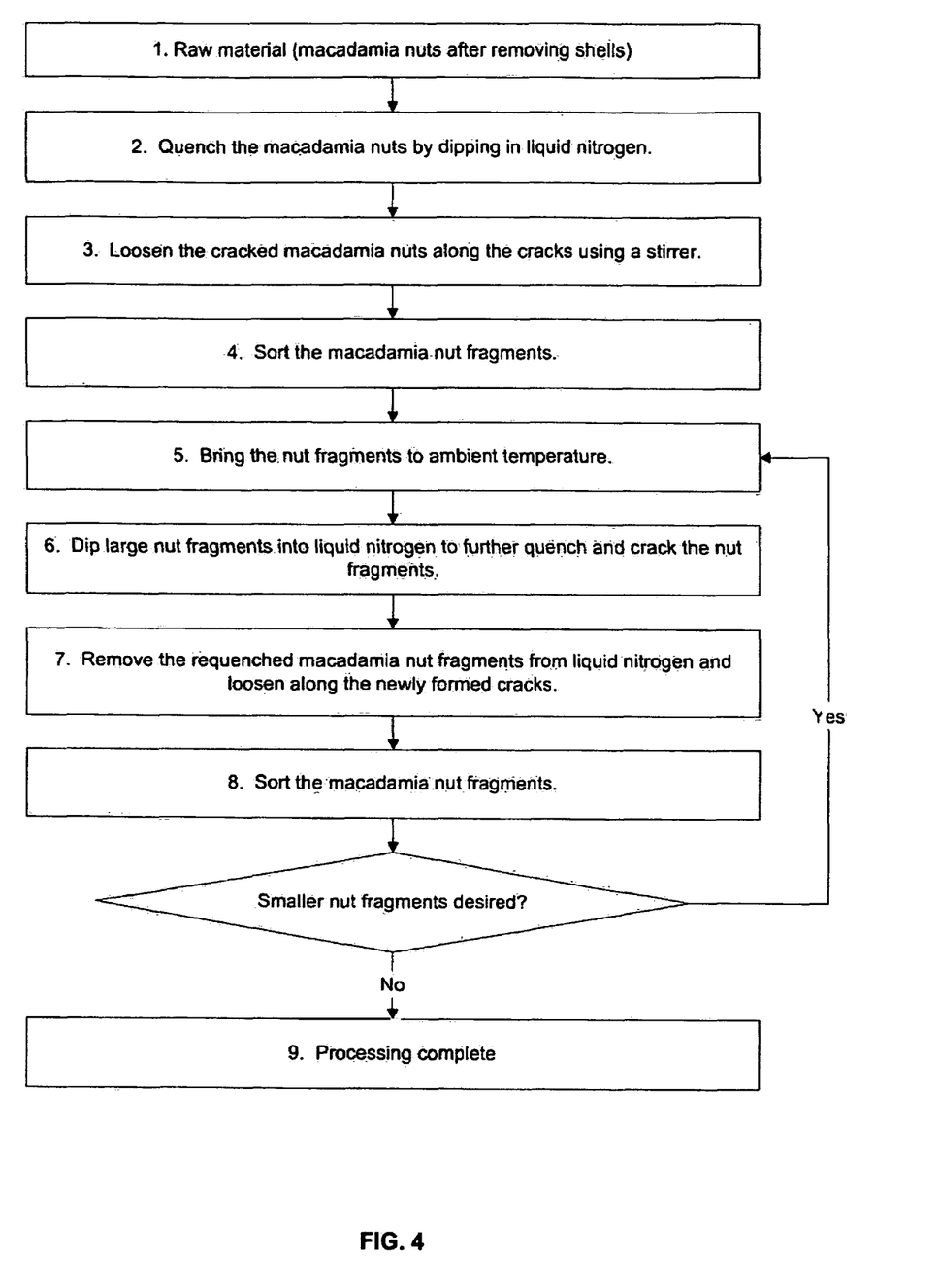
FIG. 4 is a flowchart in the case of forming macadamia small nut fragments.

In accordance with other embodiments of the present invention, FIG. 4 is a flowchart showing a method of producing macadamia nut fragments. In step 1, the raw material nuts are provided. In this example, the raw material nuts are macadamia nuts whose shells have been removed. In step 2, the macadamia nuts are quenched by dipping them in liquid nitrogen for approximately 30 seconds to form cracks in the macadamia nuts. This can be accomplished by placing the nuts in an adiabatic container and immersing the container in a pool of liquid nitrogen.

In step 3, the macadamia nuts are removed from the liquid nitrogen. If the cracked nuts have not separated into nut fragments, the separation along the cracks can be facilitated by stirring the cracked nuts. This causes the nuts to separate along the cracks into nut fragments without needing to apply pressure causing the oily components of the nuts leach out.

In step 4, the macadamia nut fragments are sorted according to size. This can be accomplished, for example, by running the fragments through a sieve having a mesh size of 5 to 10. In step 5, the nut fragments are brought to ambient temperature. This can be accomplished, for example, by natural warming or by using a warm air blower (60 to 70° C.).

In step 6, the nut fragments having grain sizes larger than the size desired are quenched again to form cracks in the nut fragments. For example, it may be desired to separate nut fragments that are 5 mesh or greater in size in step 4, and then dip those nut fragments into liquid nitrogen (for, e.g., approximately 15 seconds) to quench the nuts to form cracks in the nut fragments. Subsequently, in step 7, the macadamia nuts are released from liquid nitrogen and the nuts are loosened along the newly formed cracks. This can be accomplished again using a stirrer under conditions such that oily components are not released.

In step 8, the macadamia nut fragments may be sorted again. If the nut fragments are still larger than the size desired, the process can return back to step 5 so that the nut fragments can be requenched and separated along the cracks formed during requenching, thereby forming even smaller nut fragments.

Finally, in step 9, when the nut fragments have reached the desired size, the processing is complete.

In other embodiments of the above-described processes, the order of the steps can be modified and some steps may be omitted. In particular, in some embodiments, the nut fragments may be brought to ambient temperature before separating the nut fragments according to size. In some embodiments, only a single quenching step may be used. In other embodiments, multiple quenching steps may be used. It may be desirable to sort the nut fragments by size before each quenching step in order to isolate and quench only those nut fragments that are of an undesirably large size.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. For example, various conditions such as dipping time and the number of repeated dippings were selected in order to obtain small nut fragments in desired sizes. In other embodiments, the conditions may vary, depending on the type of nut and the type of processing desired. The description is not intended to be exhaustive or to limit the invention to the precise form disclosed. It should be understood that the invention can be practiced with modification and alteration and that the invention be limited only by the claims and the equivalents thereof.

What is claimed as new and desired to be protected by Letters Patent of the United States is:

1. A method of processing a nut which has already been removed from its shell, comprising:
   forming cracks in the nut by exposing the nut to a low temperature; and
   separating the nut into a plurality of nut fragments without mechanical compression of the nut, and thereby not powdering the nut.

2. The method of claim 1, wherein the exposing the nut to the low temperature comprises exposing the nut to a cryogen.

3. The method of claim 2, wherein the cryogen comprises liquid nitrogen.

4. The method of claim 2, wherein the exposing the nut to the low temperature comprises immersing the nut in the cryogen.

5. The method of claim 2, wherein the exposing the nut to the low temperature comprises spraying the nut with the cryogen.

6. The method of claim 2, wherein the exposing the nut to the low temperature comprises placing the nut in a container and exposing the container to the cryogen.

7. The method of claim 6, wherein the exposing the container to the cryogen comprises immersing the container in the cryogen.

8. The method of claim 1, wherein the separating the nut into the plurality of nut fragments comprises agitating the nut to separate the nut fragments along the cracks formed by exposing the nut to the low temperature.

9. The method of claim 1, wherein the separating the nut into the plurality of nut fragments comprises blowing air onto the cracked nut to separate the nut fragments along the cracks formed by exposing the nut to the low temperature.

10. The method of claim 1, further comprising:
    forming cracks in each of the plurality of the nut fragments by exposing the nut fragments to a low temperature; and separating each nut fragment in the plurality of nut fragments into a plurality of smaller nut fragments.

11. The method of claim 1, further comprising:
    removing a skin from the nut after forming cracks in a plurality of the nut fragments by exposing the nut fragments to the low temperature.

12. The method of claim 1, further comprising dropping the nut after the exposing, thereby separating the nut into the plurality of fragments.

* * * * *